(12) United States Patent
Jimbo

(10) Patent No.: US 7,732,513 B2
(45) Date of Patent: Jun. 8, 2010

(54) RESIN MOLD FOR MOLDING CURABLE RESIN AND METHOD OF PRODUCING MOLDED CURED RESIN ARTICLE

(75) Inventor: Toshihiko Jimbo, Chiyoda-ku (JP)

(73) Assignee: Zeon Corporation, Tokyo (JP)

( * ) Notice: Subject to any disclaimer, the term of this patent is extended or adjusted under 35 U.S.C. 154(b) by 1166 days.

(21) Appl. No.: 11/341,447

(22) Filed: Jan. 30, 2006

(65) Prior Publication Data

US 2006/0169869 A1 Aug. 3, 2006

(30) Foreign Application Priority Data

Jan. 28, 2005 (JP) ............................. 2005-022172

(51) Int. Cl.
*C08K 5/34* (2006.01)
*B28B 7/34* (2006.01)

(52) U.S. Cl. ...................................... 524/100; 249/134

(58) Field of Classification Search ................ 524/100
See application file for complete search history.

(56) References Cited

U.S. PATENT DOCUMENTS 6,204,348 B1 * 3/2001 Raetzsch et al. ............ 526/351
6,633,722 B1 * 10/2003 Kohara et al. ............... 385/146

FOREIGN PATENT DOCUMENTS

JP 2000108137 A * 4/2000

OTHER PUBLICATIONS

Translation of JP 2000108137, Apr. 2000.*

* cited by examiner

*Primary Examiner*—Ling-Siu Choi
*Assistant Examiner*—Hui Chin
(74) *Attorney, Agent, or Firm*—Westerman, Hattori, Daniels & Adrian, LLP (57) ABSTRACT

A resin mold for molding a curable resin, which has been made by molding a resin composition comprising an alicyclic structure-containing polymer and a nitrogen-containing organic compound (X) having at least one nitrogen atom which is bonded to at least one tertiary or quaternary carbon atom. A curable resin is molded and cured using a combined mold which is a combination of two resin molds (A) and (B), wherein at least one (A) of the two resin molds is made by molding a resin composition comprising an alicyclic structure-containing polymer and the nitrogen-containing organic compound (X). Preferably, the two molds (A) and (B) are made by molding resin compositions comprising an alicyclic structure-containing polymer and different amounts of the nitrogen-containing organic compound (X).

4 Claims, 1 Drawing Sheet

FIG. 1

RESIN MOLD FOR MOLDING CURABLE RESIN AND METHOD OF PRODUCING MOLDED CURED RESIN ARTICLE

BACKGROUND OF THE INVENTION (1) Field of the Invention

This invention relates to a resin mold for molding a curable resin, a molded cured resin article made using the mold, and a method for producing the molded cured resin article. More particularly, it relates to a resin mold for molding a curable resin suitable for use as a combined resin mold for molding a curable resin, having an enhanced selectivity to mold release; a molded cured resin article made using the resin mold; and a method for producing the molded cured resin article.

(2) Description of the Related Art

As a process for producing a shaped cured resin article of a sheet or plate form such as a compact disk, a lenticular lens, LED, a Fresnel lens, a prism sheet and a light guide plate, a process is adopted wherein a resin mold made of polycarbonate or polymethacrylate is charged with a curable resin such as an acrylate, and the curable resin is irradiated, for example, with ultraviolet rays to be thereby cured.

In the case when a resin mold is made from polycarbonate or polymethacrylate, the mold tends to be distorted by moisture or heat generated upon the curing reaction, and therefore, problems arise in that fine indentations or protrusions on the surface of the mold are distorted and, when the mold is released from the molded cured resin article, the mold releasing cannot be smoothly effected, especially a thin large-size sheet-form molded cured resin article is often difficult to remove without breaking, and fine indentations or protrusions on the resin mold surface cannot be replicated with high accuracy.

To solve the above-mentioned problems, it has been proposed in Japanese Unexamined Patent Publication No. 2000-108137 to use a resin mold for molding a curable resin, made from a resin composition comprising an alicyclic structure-containing polymer, and, for further enhancing the mold releasability, to incorporate a mold release agent in the resin composition for the resin mold.

A process for producing a molded cured resin article using a resin mold for molding a curable resin comprises a step of curing a curable resin within a cavity formed between a male mold and a female mold in a combined mold, and a step of releasing the molded cured resin article from the combined mold. To automatically conduct the mold release, a selectivity to mold release is required, that is, a specific resin mold must be first released from the as-molded cured resin article while the as-molded cured resin article holds the other resin mold. The inventor has found that the curing and mold release in the process proposed in the above-mentioned patent publication have a problem of reduced selectivity to mold release.

SUMMARY OF THE INVENTION

In view of the foregoing, a primary object of the present invention is to provide a resin mold for molding a curable resin, which has a holding property of a desired extent and exhibits an enhanced selectivity to mold release, and which is suitable for a combined resin mold for curing a curable resin.

To achieve the above-mentioned object, the inventor made extensive research on an additive ingredient to be incorporated in a resin composition comprising an alicyclic structure-containing polymer, which composition is used for a resin mold for molding a curable resin. Consequently the inventor found that a resin mold, made from a resin composition comprising an alicyclic structure-containing polymer and a specific nitrogen-containing organic compound as an additive ingredient, has a holding characteristic of a desired extent, and further found that excellent selectivity to mold release can be obtained in the case when a combined mold is used which is composed of such resin mold having a holding property of a desired extent and a resin mold made from a resin composition comprising an alicyclic structure-containing polymer, but, not comprising the specific nitrogen-containing organic compound or comprising a reduced amount of the specific nitrogen-containing organic compound. Thus, the present invention has been completed.

In one aspect of the present invention, there is provided a resin mold for molding a curable resin, which has been made by molding a resin composition comprising an alicyclic structure-containing polymer and a nitrogen-containing organic compound (X) having at least one nitrogen atom which is bonded to at least one tertiary or quaternary carbon atom.

The surface of the resin mold, which is in contact with the curable resin, preferably has a contact angle $\theta$ with water in the range of 10 to 95 degree. The resin composition for the resin mold preferably has a tensile elongation in the range of 30% to 200%.

In another aspect of the present invention, there is provided a molded cured resin article made from a curable resin by using the above-mentioned resin mold.

In a still another aspect of the present invention, there is provided a combined resin mold for molding a curable resin which is a combination of two resin molds, at least one of which is a resin mold for molding a curable resin, which is made by molding a resin composition comprising an alicyclic structure-containing polymer and a nitrogen-containing organic compound (X) having at least one nitrogen atom which is bonded to at least one tertiary or quaternary carbon atom.

Preferably the two resin molds are made by molding resin compositions comprising an alicyclic structure-containing polymer and different amounts of the nitrogen-containing organic compound (X).

In a preferable combined resin mold for molding a curable resin, the resin composition used for one (A) of the two molds and the resin composition used for the other mold (B) comprise (a) % by weight and (b) % by weight, respectively, of the nitrogen-containing organic compound (X), based on the weight of the respective resin compositions; and, the two resin compositions satisfy the following formula;

$$(b) \leq (a)/10$$

In another combined resin mold for molding a curable resin, the surface of one (A) of the two molds and the surface of the other mold (B), which surfaces are to be in contact with the curable resin, have contact angles with water of $\theta$ degree and $\theta'$ degree, respectively; and, the two molds (A) and (B) satisfy the following inequalty:

$$(\theta + 5) < \theta'$$

In a further aspect of the present invention, there is provided a process for producing a molded cured resin article, which comprise the steps of:

curing a curable resin in a cavity formed within a combined mold which is a combination of two resin molds (A) and (B), to form a molded cured resin article; at least one (A) of the two resin molds (A) and (B) having been made by molding a resin composition comprising an alicyclic structure-containing polymer and a nitrogen-containing organic compound (X) having at least one nitrogen atom which is bonded to at least one tertiary or quaternary carbon atom;

releasing the resin mold (B) from the thus-formed cured molded resin article while the cured resin article is in the state of holding the resin mold (A); and then, releasing the resin mold (A) from the molded cured resin article.

Preferably the two molds (A) and (B) have been made by molding resin compositions comprising an alicyclic structure-containing polymer and different amounts of the nitrogen-containing organic compound (X).

In a further aspect of the present invention, there is provided a molded cured resin article made from a curable resin by the above-mentioned production process.

PREFERRED EMBODIMENTS OF THE INVENTION

Alicyclic Structure-Containing Polymer

The alicyclic structure-containing polymer used according to the present invention is a polymer comprising repeating units having an alicyclic structure. The alicyclic structure can be present in any of the main backbone or the branches.

The alicyclic structure includes a cycloalkane structure, a cycloalkene structure and others. In view of the thermal stability, a cycloalkane structure is preferable.

The alicyclic structure has usually 4 to 30 carbon atoms, preferably 5 to 20 carbon atoms and more preferably 5 to 15 carbon atoms. When the carbon number of alicyclic structure is within these ranges, the resulting resin mold for curing a curable resin has good thermal stability.

The amount of the repeating units having an alicyclic structure in the alicyclic structure-containing polymer is appropriately determined depending upon the desired use, but the amount is usually at least 50% by weight, preferably at least 70% by weight and more preferably at least 90% by weight based on the weight of polymer. By using a polymer comprising such amounts of repeating units with an alicyclic structure, a resin mold for curing a curable resin having good heat resistance can be produced.

The kind and amount of repeating units other than the repeating units having an alicyclic structure in the alicyclic structure-containing polymer are appropriately determined depending upon the desired use.

The alicyclic structure-containing polymer includes, for example, (1) norbornene polymers, (2) mono-cyclic olefin polymers, (3) cyclic conjugated diene polymers and (4) vinyl alicyclic hydrocarbon polymers, and hydrogenation products of these polymers.

Of the above-recited polymers, norbornene polymers, cyclic conjugated diene polymers, vinyl alicyclic hydrocarbon polymers and hydrogenation products of these polymers are preferable because these polymers and hydrogenation products give a resin mold for curing a curable resin having improved heat resistance and high mechanical strengths. Norbornene polymers, vinyl alicyclic hydrocarbon polymers and hydrogenation products of these polymers are more preferable. Hydrogenation products of norbornene polymers are especially preferable.

(1) Norbornene Polymer

Norbornene polymers include, for example, a ring-opened polymer prepared by ring-opening polymerization of a norbornene monomer, a ring-opened copolymer prepared by ring-opening copolymerization of a norbornene monomer with other monomer capable of being copolymerized by ring-opening copolymerization, hydrogenation products of the ring-opened polymer and copolymer, an addition polymer prepared by addition polymerization of a norbornene monomer, and an addition copolymer prepared by addition copolymerization of a norbornene monomer with other copolymerizable monomer. Of these, a hydrogenation product of a ring-opened polymer prepared from a norbornene monomer is most preferable because the resulting resin mold for curing a curable resin has improved heat resistance and high mechanical strength.

The norbornene monomer as used according to the present invention is a compound having a norbornene structure represented by the following formula (1).

Formula (1):

As specific examples of the norbornene monomer, there can be mentioned bicycle[2.2.1]hept-2-ene (trivial name: norbornene) and its derivatives (i.e., those which have a substituent or substituents on the norbornene ring), tricyclo-[4.3.0.1$^{2,5}$]deca-3,7-diene (trivial name: dicyclopentadiene) and its derivatives, tetracyclo[7.4.0.0$^{2,7}$.1$^{10,13}$]trideca-2,4,6,11-tetraene (trivial name: methanotetrahydrofluorene) and its derivatives, tetracyclo[4.4.0.1$^{2,5}$.1$^{7,10}$]dodeca-3-ene (trivial name: tetracyclododecene) and its derivatives.

The substituents in the derivatives include, for example, alkyl, alkylene, vinyl and alkoxycarbonyl groups, and the norbornene monomers may have either one kind of substituent or at least two kinds thereof. As specific examples of the norbornene monomer having such subtituents, there can be mentioned 8-methoxycarbonyl-tetracyclo[4.4.0.1$^{2,5}$.1$^{7,10}$]dodeca-3-ene and 8-methyl-8-methoxycarbonyl-tetracyclo-[4.4.0.1$^{2,5}$.1$^{7,10}$]dodeca-3-ene. Of these substituents, a substituent having no polarity such as alkyl group, an alkylene group or a vinyl group is preferable because a resulting resin mold for molding a curable resin has enhanced moisture resistance.

The norbornene monomers may be used either alone or as a combination of at least two thereof.

The monomer capable of being copolymerized with the norbornene monomer by ring-opening copolymerization includes, for example, mono-cyclic olefin monomers such as cyclohexene, cycloheptene and cyclooctene. These copolymerizable monomers may be used either alone or as a combination of at least two thereof.

The above-mentioned ring-opened polymers and copolymers can be prepared from a norbornene monomer alone or a combination of at least two norbornene monomers, or a combination of a norbornene monomer or monomers with a copolymerizable monomer by ring-opening polymerization effected in the presence of a conventional catalyst for ring-opening polymerization.

The catalyst for ring-opening polymerization includes, for example, a catalyst comprising a combination of a halide, a nitrate or an acetylacetone compound of metal such as ruthenium or osmium with a reducing agent; and a catalyst comprising a combination of a halide or an acetylacetone compound of metal such as titanium, zirconium, tungsten or molybdenum with an organoaluminum compound.

The hydrogenating product of the ring-opened polymer or copolymer prepared by a ring-opening polymerization or copolymerization of a norbornene monomer can be produced by a procedure wherein a conventional hydrogenation catalyst comprising a transitional metal such as nickel or palladium is incorporated in a polymerization liquid containing the ring-opened polymer or copolymer whereby carbon-carbon unsaturated bonds of the polymer or copolymer are hydrogenated.

The addition polymer of a norbornene monomer and the addition copolymer of a norbornene monomer with another norbornene monomer or with other copolymerizable monomer can be produced by polymerizing or copolymerizing these monomers using a conventional addition polymerization catalyst comprising, for example, a combination of a titanium, zirconium or vanadium compound with an organoaluminum compound.

As specific examples of the monomers which are copolymerizable with a norbornene monomer, there can be mentioned α-olefins having 2 to 20 carbon atoms such as ethylene, propylene, 1-butene, 1-pentene, 1-hexene, 1-octene, 1-decene, 1-dodecene, 1-tetradecene, 1-hexadecane, 1-octadecene and 1-eicocene, and derivatives of these a-olefins; cycloolefins such as cyclobutene, cyclopentene, cyclohexene, cyclooctene and 3a,5,6,7a-tetrahydro-4,7-methano-1H-indene, and derivatives of these cycloolefins; and non-conjugated dienes such as 1,4-hexadiene, 4-methyl-1,4-hexadiene, 5-methyl-1,4-hexadiene and 1,7-octadiene. Of these, α-olefins, especially ethylene is preferable.

These monomers copolymerizable with a norbornene monomer may be used either alone or as a combination of two or more thereof. In the case when a norborne monomer is copolymerized with a copolymerizable monomer by addition copolymerization, the realative amounts of these monomers are appropriately determined so that the ratio by weight of the norbornene monomer units to the copolymerizable monomer units in the addition copolymer is in the range of 30/70 to 99/1, preferably 50/50 to 97/3 and more preferably 70/30 to 95/5.

(2) Mono-Cyclic Olefin Polymer

The mono-cyclic olefin polymer includes, for example, addition polymers and copolymers, prepared by polymerization or copolymerization of mono-cyclic olefin monomers such as cyclohexene, cycloheptene and cyclooctene.

(3) Cyclic Conjugated Diene Polymer

The cyclic conjugated diene polymer includes, for example, addition polymers and copolymers, prepared by 1,2- or 1,4-addition polymerization or copolymerization of cyclic conjugated diene monomers such as cyclopentadiene and cyclohexadiene, and hydrogenation products thereof.

The molecular weights of the norbornene polymers, the mono-cyclic olefin polymers and the cyclic conjugated diene polymers are appropriately determined depending upon the intended use of the resin mold, but, the molecular weights are usually in the range of 5,000 to 500,000, preferably 8,000 to 200,000 and more preferably 10,000 to 100,000 as measured by gel permeation chromatography using a cyclohexane solution (if the polymer is insoluble in cyclohexane, a toluene solution is used) and as expressed by the weight average molecular weight in terms of those of polyisoprene or polystyrene. When the molecular weights fall in these ranges, a resulting resin composition has good processability and shapability, and a resulting resin mold for molding a curable resin has good and well-balanced mechanical strengths.

(4) Vinyl Alicyclic Hydrocarbon Polymer

The vinyl alicyclic hydrocarbon polymers include, for example, polymers of vinyl alicyclic hydrocarbon monomers such as vinylcyclohexene and vinylcyclohexene, and hydrogenation products thereof; and hydrogenation products prepared by hydrogenating unsaturations in the aromatic ring of polymers prepared by polymerization of vinyl aromatic monomers such as styrene and α-methylstyrene. These polymers may be any of homopolymers of vinyl alicyclic hydrocarbon monomers and random or block copolymers of a vinyl alicyclic hydrocarbon monomer or a vinyl aromatic monomer with other copolymerizable monomers, and hydrogenation products thereof. The block copolymer is not particularly limited, and includes multi-block copolymers such as diblock copolymer, triblock copolymer or more-block copolymer, and inclined block copolymer.

The molecular weight of the vinyl alicyclic hydrocarbon polymers is appropriately determined depending upon the intended use of the resin mold, but, the molecular weight is usually in the range of 10,000 to 300,000, preferably 15,000 to 250,000 and more preferably 20,000 to 200,000 as measured by gel permeation chromatography using a cyclohexane solution (if the polymer is insoluble in cyclohexane, a toluene solution is used) and as expressed by the weight average molecular weight in terms of those of polyisoprene or polystyrene. When the molecular weights fall in these ranges, a resulting resin composition has good processability and shapability, and a resulting resin mold for molding a curable resin has good and well-balanced mechanical strengths.

The melt mass flow rate (MFR) of the alicyclic structure-containing polymer used according to the present invention is not particularly limited, but MFR is usually in the range of 1 to 100 g/10 min., preferably 2 to 70 g/10 min. and more preferably 3 to 50 g/10 min., in view of moldability for a resin mold.

The mass flow rate (MFR) as herein used refers to those which are measured according to JIS K7210 under conditions of a temperature of 280° C. and a load of 2.16 kg.

The glass transition temperature (Tg) of the alicyclic structure-containing polymer used according to the present invention is not particularly limited, but Tg is preferably at least 70° C., more preferably in the range of 100 to 250° C., especially preferably 100 to 200° C. and most preferably 100 to 140° C. When Tg is in these ranges, the polymer has good kneadability, a resulting resin composition for the resin mold exhibits good processability and moldability, and the polymer and a resulting resin mold for molding a curable resin have well-balanced heat resistance.

The content of the alicyclic structure-containing polymer in the resin composition for the resin mold according to the present invention is usually in the range of 50 to 99.99% by weight, preferably 80 to 99.99% by weight, more preferably 85 to 99.99% by weight and especially preferably 95 to 99.95% by weight, based on the resin composition.

Nitrogen-Containing Organic Compound (X)

The nitrogen-containing organic compound (X) used according to the present invention has at least one nitrogen atom which is bonded to at least one tertiary or quaternary carbon atom. By the term "guaternary carbon atom" as used herein, we mean a carbon atom having bonded thereto four atoms other than hydrogen atom. The term "tertiary carbon atom" as used herein refers to a carbon atom having bonded thereto one hydrogen atom and three atoms other than hydrogen atom.

Preferably the nitrogen-containing organic compound (X) has at least one nitrogen atom which is bonded to at least one quaternary carbon atom. The number of the tertiary or quaternary carbon atoms, to which each or the nitrogen atom is bonded, is preferably 2 or 3, more preferably 2. The number of the nitrogen atom which is bonded to at least one tertiary or quaternary carbon atom is preferably at least 2, more preferably at least 3. The nitrogen atom, which is bonded to at least one tertiary or quaternary carbon atom, preferably has one hydrogen atom bonded thereto.

The nitrogen-containing organic compound (X) includes, for example, high-molecular-weight nitrogen-containing organic compounds having a structure such that a plurality of piperidine rings are bonded via a triazine skeleton, and nitrogen-containing organic compounds having a structure such that a piperidine ring is bonded to an ester group.

As specific examples of the high-molecular-weight nitrogen-containing organic compounds having a structure such that a plurality of piperidine rings are bonded via a triazine skeleton, there can be mentioned N,N',N'',N'''-tetrakis-(4,6-bis(butyl(N-methyl-2,2,6,6-tetramethylpiperidin-4-yl)-amino)-triazine-2-yl)-4,7-diazadecane-1,10-amine, a polycondensate of dibutylamine, 1,3,5-triazine and N,N-bis(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene-{(2,2,6,6-tetramethyl-4-piperidyl)imino}], poly-[{6-morpholino-s-triazine-2,4-diyl)}{(2,2,6,6-tetramethyl-4-piperidyl)imino}hexamethylene{(2,2,6,6-tetramethyl-4-piperidyl)imino}], a polycondensate of 1,6-hexanediamine-N,N'-bis(2,2,6,6-teyramethyl-4-piperidyl) and morpholine-2,4,6-trichloro-1,3,5-triazine, poly[(6-morpholino-s-triazine-2,4-diyl)-[(2,2,6,6-tetramethyl-4-piperidyl)imino]hexamethylene[(2,2,6,6-tetramethyl-4-piperidyl)imino], a condensate of N,N'-bis(3-aminopropyl)-ethylenediamine-2,4-bis[N-butyl-N-(1,2,2,6,6-pentamethyl-4-piperidyl)amino]-6-chloro-1,3,5-triazine, and a polycondensate of dibutylamine, 1,3,5-triazine, N,N-bis[2,2,6,6-tetramethyl-4-piperidyl-1,6-hexamethylenediamine and N-(2,2,6,6-tetramethyl-4-piperidyl)butylamine.

As specific examples of the nitrogen-containing organic compounds having a structure such that a piperidine ring is bonded to an ester group, there can be mentioned 4-benzoyloxy-2,2,6,6-tetramethylpiperidine, bis(2,2,6,6-tetramethyl-4-piperidyl)sebacate, a polycondensate of dimethyl succinate and 4-hydroxy-2,2,6,6-tetramethyl-1-piperidine ethanol, and a mixed ester of 1,2,3,4-butanetetracarboxylic acid, 1,2,2,6,6-pentamethyl-4-pieridinol and 3,9-bis(2-hydroxy-1,1-dimethylethyl)-2,4,8,10-tetraoxaspiro[5,5]undecane.

Of the above-recited specific examples of nitrogen-containing organic compound (X), poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], and a polycondensate of dibutylamine, 1,3,5-triazine, N,N-bis[2,2,6,6-tetramethyl-4-piperidyl-1,6-hexamethylenediamine and N-(2,2,6,6-tetramethyl-4-piperidyl)butylamine are preferable.

Among the nitrogen-containing organic compound (X), those which have at least one structure selected from a triazine skeleton and a piperidine ring are preferable. Those which have a triazine skeleton are more preferable. Those which have both a triazine skeleton and a piperidine ring are especially preferable. Due to the inclusion of a triazine skeleton, the resulting resin mold has enhanced heat stability.

The nitrogen-containing organic compound (X) preferably has a molecular weight in the range of 250 to 100,000, more preferably 1,500 to 10,000. When the molecular weight of compound (X) is within these ranges, the amount of bleed as occurring in the course of resin mold is minimized and the contamination of resin mold can be prevented.

The content of the nitrogen-containing organic compound (X) in the resin composition for the resin mold [resin mold (A)] according to the present invention is preferably in the range of 0.01 to 20% by weight, more preferably 0.1 to 15% by weight and especially preferably 0.5 to 5% by weight, based on the resin composition. When the content of compound (X) is within these ranges, the amount of bleed as occurring in the course of resin mold is minimized and the contamination of resin mold can be prevented.

Various ingredients can be incorporated in the resin composition for the resin mold according to the present invention. The ingredients include, for example, stabilizers such as an antioxidant, a heat stabilizer and a weathering stabilizer; resin modifiers such as a plasticizer; antistatic agents such as surface active agents and carbon nanotubes; lubricants; and other kinds of polymers (rubbers and resins), especially soft polymers. These ingredients may be incorporated either alone or as a combination of at least two thereof. The amount of these ingredients is appropriately determined within a range in which the object of the present invention is achieved.

The antioxidant includes, for example, a phenolic antioxidant, a phosphorus-containing antioxidant and a sulfur-containing antioxidant. Of these, a phenolic antioxidant is preferable. An alkyl-substituted phenolic antioxidant is especially preferable. By the incorporation of these antioxidants, coloration of a resin mold and reduction of mechanical strength thereof, which are caused by oxidative deterioration at the step of molding a resin mold for molding a curable resin, can be minimized or prevented without reduction of UV ray transmission of the resin mold. The antioxidant may be used either alone or as a combination of at least two thereof. The amount of antioxidant is appropriately determined within a range in which the object of the present invention is achieved, but it is usually in the range of 0.001 to 5 parts by weight, preferably 0.01 to 1 part by weight, based on 100 parts by weight of an alicyclic structure-containing polymer.

The other kinds of polymers (rubbers and resins) to be incorporated in the resin composition for the resin mold preferably include soft polymers, and, as specific examples thereof, there can be mentioned olefin polymers such as polyethylene and polypropylene; isobutylene polymers such as polyisobutylene and isobutylene-isoprene rubber; diene polymers such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer, a styrene-isoprene-styrene block copolymer; acrylate and methacrylate polymers such as polybutyl acrylate and polyhydroxyethyl acrylate; polymers of vinyl compounds such as polyvinyl alcohol, polyvinyl acetate and a vinyl acetate-styrene copolymer; epoxy polymers such as polyethylene oxide, polypropylene oxide and epichlorohydrin rubber; and fluoropolymers such as vinylidene fluoride rubber and tetrafluoroethylene-propylene rubber. These polymers may have a crosslinked structure, or may have a functional group introduced by a modification reaction. Of these polymers, diene polymers are preferable. Hydrogenation products produced by hydrogenating carbon-carbon unsaturated bonds of the diene polymers are especially preferable because of enhanced rubber elasticity, mechanical strength, pliability and dispersibility.

Resin Composition

The resin composition used for producing the resin mold for molding a curable resin according to the present invention can be prepared by a method wherein the alicyclic structure-containing polymer, the nitrogen-containing organic compound (X) and optional ingredients are mixed and kneaded together; and a method wherein the alicyclic structure-containing polymer, the nitrogen-containing organic compound (X) and optional ingredients are mixed together in a solvent, and then the solvent is removed from the mixture.

The kneading can be carried out using, for example, a single screw extruder, a twin screw extruder, a Banbury mixer, a kneader or a feeder-ruder. The kneading temperature is preferably in the range of 180 to 400° C., more preferably 200 to 350° C. The respective ingredients can be added for mixing either at the same time prior to kneading or separately in lots while being kneaded.

The tensile elongation of the resin composition used according to the present invention is not particularly limited, but the resin composition preferably has a tensile elongation in the range of 30 to 200%, more preferably 40 to 180% and especially preferably 100 to 150%. When the tensile elongation of the resin composition is within these ranges, the resin mold is deformable to a desired extent, and the mold release can easily be conducted and breakage of the resin mold does not occur at the step of releasing the resin mold from the as-molded cured resin article.

The mass flow rate (MFR) of the resin composition used according to the present invention is not particularly limited, but the resin composition preferably has an MFR in the range of 1 to 100 g/10 min., more preferably 2 to 70 g/10 min. and especially preferably 3 to 50 g/10 min. When the MFR of resin composition is within these ranges, indentation or protrusion patterns of the resin mold can be replicated with high precision on the molded cured resin article. The melt mass flow rate (MFR) of the resin composition is measured according to JIS K7210 under conditions of temperature of 280° C. and load of 2.16 kg.

Process for Making Resin Mold for Molding Curable Resin

The resin composition can be shaped into the resin mold for molding a curable resin by conventional means such as, for example, injection molding, compression molding or extrusion. The shape of the resin mold is appropriately determined depending upon the desired use thereof.

The shaping conditions are not particularly limited. The resin temperature at shaping is usually in the range of 200 to 400° C., preferably 210 to 350° C. The mold temperature $t_o$° C. in the case of shaping using a mold is set so that the mold temperature $t_o$° C. and the glass transition temperature $t_1$° C. of the alicyclic structure-containing polymer satisfy the following inequalities:

usually, room temperature<$t_o$° C.<$(t_1+15)$° C.,
preferably, $(t_1-30)$° C.<$t_o$° C.<$(t_1+10)$° C., and
more preferably, $(t_1-20)$° C.<$t_o$° C.<$(t_1+5)$° C.;

provided that, in the case where $(t_1-30)$° C.<room temperature, or in the case where $(t_1-20)$° C.<room temperature, room temperature<$t_o$° C. By setting the resin temperature and the mold temperature so as to satisfy the above conditions, the releasability between the mold for making resin mold and the as-molded resin mold for molding a curable resin can be further enhanced.

Resin Mold for Molding Curable Resin

The contact angle (θ degree) with water of the surface of the resin mold for molding a curable resin according to the present invention, which surface is to be in contact with the curable resin, is not particularly limited. However, the contact angle θ with water is preferably in the range of 10 to 95 degree, more preferably 10 to 85 degree. When the contact angle (θ degree) with water of the surface of the resin mold for molding a curable resin is within this range, wettability of the resin mold with the curable resin is enhanced, and, when the resin mold is charged with a curable resin, undesirable bubble formation can be suppressed, and the indentation or protrusion pattern of the mold surface can be replicated onto a molded cured resin article with enhanced precision.

The contact angle θ with water is measured by a contact angle measuring apparatus "Drop Master 300" available from Kyowa Interface Science Co., Japan, under environmental conditions of temperature 25° C. and relative humidity 50%.

The contact angle θ with water of the surface of the resin mold can be varied depending upon the particular kind and amount of the nitrogen-containing organic compound (X).

The surface of the resin mold according to the present invention, which surface is to be in contact with a curable resin, preferably has a surface roughness in the range of 0.05 to 1 μm, more preferably 0.05 to 0.5 μm.

The surface roughness is measured by surface roughness tester "Form Talisurf" available from Lank Taylor Hobson K.K. according to JIS B-0601.

The surface roughness of the surface of the resin mold, which surface is to be in contact with a curable resin, can be varied by lapping the surface of a mold used for making the resin mold for molding a curable resin.

The thickness of the resin mold for molding a curable resin according to the present invention is not particularly limited, but it is preferably in the range of 0.5 to 2 mm, more preferably 0.5 to 1.5 mm and especially preferably 0.6 to 1.0 mm. When the thickness of the resin mold is within these ranges, the resin mold has a flexibility of a desired extent, and the mold release can be conducted while the resin mold is deformed. Therefore, the mole release can easily be conducted and surface defect does not occur on the molded cured resin article at the step of releasing the resin mold from the as-molded cured resin article.

The resin mold for molding a curable resin according to the present invention has a property of holding a molded cured resin article to a desired extent, and therefore, the resin mold is suitable for a combined mold exhibiting improved selectivity to mold release.

Curable Resin

The curable resin to be cured using the resin mold according to the present invention is not particularly limited. The resin mold can be employed for curing various curable resins widely used in the resin industry. The curable resin usually comprises a polymerizable monomer or monomers and a polymerization initiator.

As the polymerizable monomer, a radically polymerizable monomer is usually used. The radically polymerizable monomer includes compounds having, for example, at least one vinyl group, allyl group, methallyl group, acryl group or methacryl group. Of these, a compound having at least one methacryl group is especially suitable for use as an optical material because it gives a cured resin article having improved heat resistance and transparency, and it exhibits a high-rate curability.

The radically polymerizable monomer includes, for example, acrylic acid esters and methacrylaic acid esters such as an alkyl acrylate, an alkyl methacrylate, a siloxanyl acrylate, a siloxanyl methacrylate, a fluoroalkyl acrylate, a fluoroalkyl methacrylate, a hydroxyalkyl acrylate, a hydroxyalkyl methacrylate, a polyethylene glycol acrylate, a polyethylene glycol methacrylate, an acrylic acid ester of a polyhydric alcohol, a methacrylic acid ester of a polyhydric alcohol, vinyl acrylate and vinyl metacrylate; and vinyl compounds such as styrene derivatives, N-vinyllactam and a vinyl ester of a mono- or polycarboxylic acid.

As specific examples of the radically polymerizable monomer, there can be mentioned styrene, acrylic acid, methyl acrylate, ethyl acrylate, n-butyl acrylate, phenyl acrylate, 2-hydroxy-ethyl acrylate, 2-hydroxypropyl acrylate, methacrylic acid, methyl methacrylate, ethyl methacrylate, n-butyl methacrylate, 2-ethylhexyl methacrylate, isobornyl methacrylate, benzyl methacrylate, phenyl methacrylate, 2-hydroxyethyl methacrylate, 2-hydroxypropyl methacrylate, 2-hydroxybutyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, propylene glycol diacrylate, propylnene glycol dimethacrylate, trimethylolpropane triacrylate, trimethylol-propane trimethacrylate, pentaerythritol triacrylate, pentaerythritol trimethacrylate, 1,4-butanediol diacrylate, 1,4-butanediol dimethacryalte, 1,6-hexanediol diacrylate, 1,6-hexanediol dimethacrylate, glycerol diacrylate, glycerol dimethacrylate, divinylbenzenediallyl phthalate, diethylene glycol bisallylcarbonate, 2-methacryloyloxyethylsuccinic acid, fumaric acid and its esters, methacrylonitrile, N,N-dimethyl-acrylamide, N-vinyl-2-pyrrolidone and 2-methacryloyloxyethylphosphorylcholine. These polymerizable monomers may be used either alone or as a combination of at least two thereof.

The polymerization initiator may be any of thermal polymerization initiators and photopolymerization initiators. Photopolymerization initiators are preferable in view of high productivity.

As specific examples of the photopolymerization initiator, there can be mentioned carbonyl compounds such as benzoin, benzoin monomethyl ether, benzoin isopropyl ether, acetoin, benzaphenone, p-methoxybenzophenone, diethoxyacetophenone, benzyldimethylketal, 2,2-diethoxyacetophenone, 1-hydroxy-cyclohexyl phenyl ketone, methylphenyl glyoxylate, ethylphenyl glyoxylate, 2-hydroy-2-methyl-1-phenylpropan-1-one and 2-ethylanthraquinone; sulfur-containing compounds such as tetramethylthiuram monosulfide; and acylphosphine oxides such as 2,6-dimethylbenzoyl-diphenylphosphine oxide and 2,4,6-trimethylbenzoylphenylphosphine oxide.

As specific examples of the thermal polymerization initiator, there can be mentioned benzoyl peroxide, diisopropyl peroxycarbonate and t-butyl peroxy(2-ethylhexanoate).

These polymerization initiators may be used either alone or as a combination of at least two thereof.

The amount of polymerization initiator is appropriately determined depending upon the particular use of molded article, but the amount is usually in the range of 0.001 to 5 parts by weight, preferably 0.01 to 1 part by weight, based on 100 parts by weight of the polymerizable monomer. When the amount of polymerization initiator is within these ranges, uniform curing can be carried out even when the molded article has a large size, and the molded article has no discoloration, is uniform, and has good resistance to yellowing. Even a colored molded article can be produced with high productivity.

The process for producing a molded cured resin article using the resin mold according to the present invention is not particularly limited. For example, the molded cured resin article can be produced by a process wherein a curable resin is charged in a cavity formed within the resin mold, the charged resin is cured to form a molded cured resin article, and then the resin mold is released from the molded cured resin article; a process wherein a curable resin is charged within a cavity formed within a combined mold which is a combination of the resin mold according to the present invention and another resin mold for molding a curable resin or another mold, the charged curable resin is cured to form a molded cured resin article, and then the resin mold and the other mold are released from the molded cured resin article; and a process wherein a substrate is coated with a curable resin, the resin mold according to the present invention is superposed on the resin coating, the resin coating is cured and then, the resin mold is released from the composite comprised of the substrate and the molded cured resin.

The procedure for curing the curable resin is not particularly limited, and the curing can be carried out by irradiating a curable resin composition comprising a polymerizable monomer and a photopolymerization initiator with activation energy rays or by heating a curable resin composition comprising a polymerizable monomer and a thermal polymerization initiator.

Combined Mold for Molding Curable Resin

The resin mold for molding a curable resin according to the present invention [which resin mold is referred to as "resin mold (A)" when appropriate] can be used alone. But, the resin mold (A) has a property of holding the molded cured resin article to a desired extent, and therefore, it is preferable to use the resin mold (A) in combination with another resin mold for molding a curable resin [which resin mold is referred to as "resin mold (B)" when appropriate]. The resin mold (B) may be either a resin mold for molding a curable resin according to the present invention, or another mold made by molding a resin composition comprising an alicyclic structure-containing polymer but not comprising the nitrogen-containing organic compound (X).

Preferably the resin molds are made by molding resin compositions comprising an alicyclic structure-containing polymer and different amounts of the nitrogen-containing organic compound (X). More preferably the two resin molds (A) and (B) satisfy the following formula: (b)≦(a)/10 where (a) is the content (% by weight) of nitrogen-containing organic compound (X) in a resin composition used for making the resin mold (A), and (b) is the content (% by weight) of nitrogen-containing organic compound (X) in a resin composition used for making the resin mold (B).

In the process for producing the molded cured resin article using a combined mold comprising the resin mold (A) and the resin mold (B), a curable resin is cured in a cavity formed within the combined mold, i.e., between the resin mold (A) and the resin mold (B) to form a molded cured resin article; and the resin mold (B) is released from the as-molded cured resin article which holds the resin mold (A); and then, the resin mold (A) is released from the molded cured resin article. This process can be conducted automatically and thus with enhanced productivity.

The resin mold (B) can be made by the same method as for making the resin mold (A).

The contact angle θ with water of the surface of the resin mold (B), which surface is to be in contact with a curable resin, is not particularly limited, but, it is preferable that the contact angle θ with water of the surface of the resin mold (B) and the contact angle θ with water of the surface of the resin mold (A) satisfy the inequality: (θ+5)<θ' more preferably the inequality: (θ+20)<θ', and especially preferably the inequality: (θ+40)<θ'.

The thickness of the resin mold (B) is not particularly limited, but it is preferably in the range of 0.5 to 2 mm, more preferably 0.5 to 1.5 mm and especially preferably 0.6 to 1.0 mm. When the thickness of the resin mold (B) is within these ranges, the resin mold (B) has a flexibility of a desired extent, and the mold release of the resin mold (B) and/or the resin mold (A) can be conducted while the resin mold (B) is deformed. Therefore, the mold release can easily be conducted and surface defect does not occur on the molded cured resin article at the step of releasing the resin molds (A) and (B) from the as-molded cured resin article.

The resin mold and the combined resin mold according to the present invention exhibit good releasability from a mold used for making the resin mold and the combined resin mold, and thus contamination of the used mold with a releasing agent can be avoided. Therefore, cleaning of the mold used is not necessary, and the productivity is enhanced, and the resin mold and the combined resin mold can be used as disposable molds.

The productivity of the resin mold and the combined resin mold is high and these resin molds can be used as disposable molds, and therefore, these resin molds have no problem of undesirable deposition of cured resin occurring when molds are repeatedly used. The resin mold and the combined mold have excellent releasability from a molded cured resin article, and therefore, these molds are suitable for the production of optical goods with high precision.

As specific examples of the optical goods, there can be mentioned an optical lens, a light guide plate, a prism sheet, a Fresnel lens, a lenticular lens, LED, an optical disk substrate, a photo-magnetic disk substrate, an optical card substrate, a light guide path and a contact lens. The mold and the combined mold are especially suitable for the production of diffusion or condenser sheets such as a Fresnel lens, a lenticular lens and a prism sheet, and a light guide plate.

The invention will be specifically described by the following production examples, invention examples and comparative examples, but is by no means limited by these examples. In these examples, parts are by weight and pressure refers to gauze pressure, unless otherwise specified.

The physical properties of a polymer, a resin composition, a resin mold and a molded cured resin article were determined by the following methods.

(1) Surface Roughness

The surface roughness of a resin mold for molding a curable resin was measured by a surface roughness tester "Form Talisurf" available from Lank Taylor Hobson K.K. according to JIS B-0601.

The measurement was conducted on five points (0,0), (3,0), (0,3), (−3,0) and (0,−3) in the coordinate system provided that the outer periphery of the resin mold is: $X^2+Y^2=6^2$. The surface roughness was expressed by the average value.

(2) Contact Angle with Water

The contact angle θ with water was measured by a contact angle measuring apparatus "Drop Master 300" available from Kyowa Interface Science Co., Japan, under environmental conditions of temperature 25° C. and relative humidity 50%.

The measurement was conducted on five points (0,0), (3,0), (0,3), (−3,0) and (0,−3) in the coordinate system provided that the outer periphery of the resin mold is: $X^2+Y^2=6^2$. The contact angle θ with water was expressed by the average value.

(3) Melt Mass Flow Rate (MFR)

The melt mass flow rate (MFR) (unit g/10 min.) was measured by an MFR measurement apparatus (SEMI AUTO MELT INDEXER 3A available from Toyo Seiki Ind. Co., Ltd.) at a temperature of 280° C. under a load of 2.16 kg according to JIS-K7210.

(4) Tensile Elongation of Resin Composition

The tensile elongation (unit: %) of a resin composition was measured by a tensile tester (AGS-10kND available from Shimadzu Corporation) according to ASTM-D-638 at a drawing rate of 5 mm/min.

(5) Selectivity to Mold Release

Figure 1:
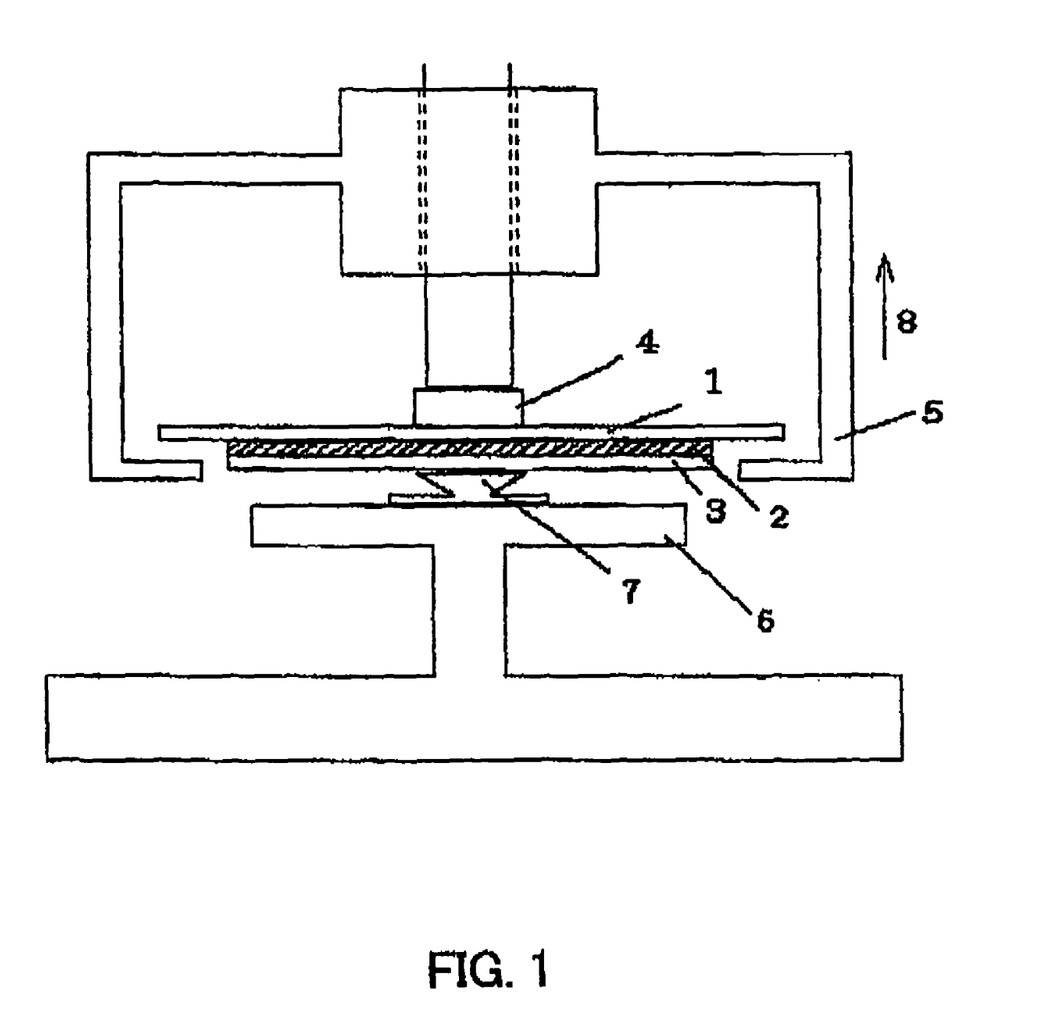
FIG. 1 is a cross-sectional view illustrating the state of releasing a resin mold 1 from a composite of resin mold 1/UV-cured molded resin article 2/resin mold 3.

As illustrated in FIG. 1, selectivity to mold release of a composite of resin mold 1/UV-cured molded resin article 2/resin mold 3 was evaluated at a drawing rate (mold releasing rate) of 0.8 mm/sec.

A composite of resin mold 1/UV-cured molded resin article 2/resin mold 3 was fixed by a suction cup 7 with a diameter of 18 mm and a presser disk 4 on a stationary platen 6. A pawl lift 5 is moved in the upward direction 8 and it was observed which of resin mold 1 {resin mold (A)} or resin mold 3 {resin mold (B)} was separated. When resin mold 3 was separated while molded cured article 2 held resin mold 1, the selectivity to mold release is evaluated as acceptable.

The selectivity to mold release was expressed by the number of separated resin mold 3 {resin mold (B)} from the composite of resin mold 1/cured molded resin article/resin mold 3, per 10 times of repeated trials for separation.

(6) Defect of Molded Cured Resin Article

The resin mold 3 {resin mold (B)} was separated from a composite of UV-cured molded resin article 2/resin mold 3 {resin mold (B)} obtained in the test of evaluation of the selectivity to mold release, and, using a microscope, the presence of bubbles within the UV-cured molded resin article 2 and the state of the surface, peeled from the resin mold (B), of the UV-cured molded resin article 2, were observed.

When the bubbles were not found or found only a negligible extent, and the peeled surface is good and smooth, the molded cured resin article is acceptable (expressed by "A" in Table 1, below). When the bubbles were found, and the peeled surface is rough, the molded cured resin article is unacceptable (expressed by "U" in Table 1, below).

(7) Glass Transition Temperature (Tg)

The glass transition temperature (Tg) was measured by a differential scanning calorimeter (DSC method).

(8) Molecular Weight of Polymer

The molecular weight of polymer was measured by gel permeation chromatography using a cyclohexane solution, and expressed as the molecular weight in terms of that of polyisoprene, unless otherwise specified.

Production Example 1-0

In a nitrogen gas atmosphere, a reactor was charged at room temperature with 500 parts of dehydrated cyclohexane, 0.82 part of 1-hexene, 0.15 part of dibutyl ether and 0.30 part of triisobutylaluminum, and the content was stirred. While the content was maintained at 45° C., 170 parts of tricyclo-[$4.3.0.1^{2,5}$]deca-3,7-diene (trivial name: dicyclopentadiene; hereinafter abbreviated to "DCP"), 30 parts of 8-ethyl-tetra-cyclo[$4.4.0.1^{2,5}.1^{7,10}$]dodeca-3-ene (hereinafter abbreviated to "ETCD"), and 80 parts of tungsten hexachloride (in a 0.7% toluene solution) were added separately and at the same time in a continuous manner over a period of 2 hours, to conduct polymerization.

To the polymerization solution, 1.06 parts of butyl glycidyl ether and 0.52 part of isopropyl alcohol were added whereby the polymerization catalyst was deactivated to stop the polymerization reaction. Gas chromatography analysis of the thus-obtained polymerization solution containing a ring-opened polymer reveled that the polymerization of conversion of the monomers was 99.5%.

To 100 parts of the ring-opened polymer-containing polymerization solution, 270 parts of cyclohexane was added, and then, 5 parts of a nickel catalyst supported on diatomaceous earth as a hydrogenation catalyst (ratio of nickel supported: 58% by weight, pore volume: 0.25 ml/g, specific surface area 180 m$^2$/g). Hydrogen was introduced to a pressure of 5 MPa and the temperature was elevated to 200° C. while being stirred, the reaction was continued for 8 hors. Thus, a solution containing a hydrogenation product of a ring-opened DCP/ETCD copolymer was obtained. The solution was filtered to remove the hydrogenation catalyst, and, using a cylindrical concentration-dryer (available from Hitachi Ltd.), cyclohexane as solvent and other volatile ingredients were removed from the solution at a temperature of 270° C. and a pressure of not more than 1 kPa. Then the thus-obtained hydrogenation product was melt-extruded through an extruder into a strand. The strand was allowed to cool and then cut into a pellet PM.

The weight average molecular weight of the hydrogenated product as measured on the pellet PM was 30,000, the ratio of unsaturations in the carbon-carbon bonds in the hydrogenation product was 0.0029%, Tg of the hydrogenation product was 100° C., the density of the hydrogenation product was 1.01 g/cm$^3$ and the metal atom content in the hydrogenation product was below 1 ppm as the total content of aluminum, tungsten and nickel.

Production Example 2-0

To 100 parts by weight of pellet PM (hydrogenation product of ring-opened DCP/ETCD copolymer) obtained in Production Example 1-0, 0.2 part of soft polymer ("Tuftec H1052" available from Asahi Kasei Chemicals Co.) and 0.1 part of antioxidant ("Irganox 1010" available form Ciba-Geigy K. K.) were added, and the mixture was kneaded together by a twin-screw kneader ("TEM-35B" available from Toshiba Machine Co., Ltd.; screw diameter: 37 mm, L/D: 32) at a resin temperature of 100° C., a feed rate of 10 kg/hour and a screw revolution of 250 rpm. The kneaded mixture was extruded into a pellet (pellet P0).

The thus-obtained resin composition (pellet P0) had an MFR of 60 g/10 min., and a tensile elongation of 120%.

Production Example 2-1

The procedures described in Production Example 2-0 were repeated to give a pellet P1 wherein, to 100 parts of the hydrogenation product of ring-opened DCP/ETCD copolymer obtained in Production Example 1-0, 5 parts of poly[{6-(1,1,3,3-tetramethylbutyl)amino-1,3,5-triazine-2,4-diyl)}{(2,2,6,6-tetramethyl-4-piperidyl)imino}hexamethylene{(2,2,6,6-tetramethyl-4-piperidyl)imino}] as a nitrogen-containing organic compound (X) was added in addition to the soft polymer and the antioxidant. All other conditions remained the same.

The thus-obtained resin composition (pellet P1) had an MFR of 104 g/10 min. and a tensile elongation of 130%.

Production Example 2-2

The procedures described in Production Example 2-1 were repeated to give a pellet P2 wherein the amount of the nitrogen-containing organic compound (X) was changed to 3 parts with all other conditions remained the same.

The thus-obtained resin composition had an MFR of 88 g/10 min. and a tensile elongation of 123%.

Production Example 2-3

The procedures described in Production Example 2-1 were repeated to give a pellet P3 wherein the amount of the nitrogen-containing organic compound (X) was changed to 1 part with all other conditions remained the same.

The thus-obtained resin composition had an MFR of 73 g/10 min. and a tensile elongation of 120%.

Production Example 2-4

The procedures described in Production Example 2-1 were repeated to give a pellet P4 wherein the amount of the nitrogen-containing organic compound (X) was changed to 0.5 part with all other conditions remained the same.

The thus-obtained resin composition had an MFR of 63 g/10 min. and a tensile elongation of 118%.

Production Example 2-5

The procedures described in Production Example 2-1 were repeated to give a pellet P5 wherein 5 parts of 4-benzoyloxy-2,2,6,6-tetramethylpiperidine was used as a nitrogen-containing organic compound (X) with all other conditions remained the same.

The thus-obtained resin composition had an MFR of 100 g/10 min. and a tensile elongation of 125%.

Production Example 2-6

The procedures described in Production Example 2-1 were repeated to give a pellet P6 wherein 5 parts of bis(2,2,6,6-tetramethyl-4-piperidyl) sebacate was used as a nitrogen-containing organic compound (X) with all other conditions remained the same.

The thus-obtained resin composition had an MFR of 107 g/10 min. and a tensile elongation of 130%.

Production Example 2-7

The procedures described in Production Example 2-1 were repeated to give a pellet P7 wherein 5 parts of 2,4-bis-(n-octylthio)-6-(4-hydroxy-3,5-di-t-butylanilino)-1,3,5-triazine [hindered phenol antioxidant] was used instead of the nitrogen-containing organic compound (X) with all other conditions remained the same.

The thus-obtained resin composition had an MFR of 101 g/10 min. and a tensile elongation of 112%.

Production Example 2-8

The procedures described in Production Example 2-1 were repeated to give a pellet P8 wherein 5 parts of hardened castor oil ("Kaowax 85P" available from Kao Corporation) was used instead of the nitrogen-containing organic compound (X) with all other conditions remained the same.

The thus-obtained resin composition had an MFR of 95 g/10 min. and a tensile elongation of 122%.

Production Example 2-9

The procedures described in Production Example 2-1 were repeated to give a pellet P9 wherein 5 parts of an anionic surface active agent ("Electro-stripper PC" available from Kao Corporation) was used instead of the nitrogen-containing organic compound (X) with all other conditions remained the same.

The thus-obtained resin composition had an MFR of 103 g/10 min. and a tensile elongation of 102%.

Production Example 3

Production of Resin Mold (B)

Using pellet P0 made in Production Example 2-0, a resin mold B having a thickness of 0.6 mm, for molding a compact disk, was produced by an injection molding machine provided with a compact-disk-shaped mold having a diameter of 14 cm with a mirror-polished surface, under molding conditions of resin temperature of 300° C. and mold temperature of 80° C.

The surface of the thus-obtained resin mold B, which is to be in contact with a curable resin, had a surface roughness of 0.05 μm and a contact angle θ with water of 95 degree.

Example 1

Using pellet P1 made in Production Example 2-1, a resin mold A1 having a thickness of 0.6 mm, for molding a compact disk, was produced by an injection molding machine provided with a compact-disk-shaped mold having a diameter of 12 cm with a mirror-polished surface, under molding conditions of resin temperature of 300° C. and mold temperature of 80° C.

The surface of the thus-obtained resin mold A1 which is to be in contact with a curable resin, had a surface roughness of 0.05 μm and a contact angle θ with water of 25 degree. When the above-mentioned molding procedure was repeated 50 times to produce 50 resin molds A1, the mold used for the production of resin molds A1 was observed by the naked eye. Contamination of the mold was not observed.

A spacer made of polytetrafluorethylene (hereinafter abbreviated to "PTFE") resin having an inner diameter of 119 mm, an outer diameter of 120 mm and a thickness of 1 mm was placed on the resin mold B. The PTFE-placed surface of resin mold B was coated with an UV-curable resin composition ("SD6099" available from Dainippon Ink and Chemicals Inc.; hereinafter referred to as "UV-curable resin composition 1") by a spin coating procedure. The resin mold A1 was superposed on the coating of UV-curable resin composition 1 so that air bubbles are not present between the coating and the resin mold A1.

The resin mold A1-superposed side was irradiated with ultraviolet rays by using a 80 W/cm high pressure mercury lamp located 10 cm apart from the resin mold A1. The total amount of ultraviolet rays was 1,000 J/cm². The time required for complete hardening was 60 seconds. Thus a composite 1-1 of resin mold A1/UV-cured resin composition product 1/resin mold B was obtained.

Similarly a composite 1-2 of resin mold A1/UV-cured resin composition product 2/resin mold B was made using a UV-curable resin composition 2 having the following composition.

| (Composition of UV-Curable Resin Composition 2) | |
| --- | --- |
| 2,3-Dihydroxypropyl methacrylate | 70 parts |
| Methyl methacrylate | 28 parts |
| Ethylene glycol dimethacrylate | 1.5 parts |
| 2,4,6-Trimethylenebenzoyldiphenylphosphine oxide | 0.5 parts |

Selectivity to mold release and defect of the cured resin composition product were evaluated on the composite 1-1 and composite 1-2. Evaluation results are shown in Table 1.

Example 2

A resin mold A2 having a thickness of 0.6 mm and a surface roughness of 0.05 μm was made by the same procedure as employed in Example 1 for the production of resin mold A1, except that pellet P2 was used instead of pellet P1.

The surface of the thus-obtained resin mold A2, which is to be in contact with a curable resin, had a contact angle θ with water of 40 degree. When the above-mentioned molding procedure was repeated 50 times to produce 50 resin molds A2, the mold used for the production of resin molds A2 was observed by the naked eye. Contamination of the mold was not observed.

By the procedures similar to those employed in Example 1, a composite 2-1 of resin mold A2/UV-cured resin composition product 1/resin mold B and a composite 2-2 of resin mold A2/UV-cured resin composition product 2/resin mold B were made.

Selectivity to mold release and defect of the cured resin composition product were evaluated on the composite 2-1 and composite 2-2. Evaluation results are shown in Table 1.

Example 3

A resin mold A3 having a thickness of 0.6 mm and a surface roughness of 0.05 μm was made by the same procedure as employed in Example 1 for the production of resin mold A1, except that pellet P3 was used instead of pellet P1.

The surface of the thus-obtained resin mold A3, which is to be in contact with a curable resin, had a contact angle θ with water of 70 degree. When the above-mentioned molding procedure was repeated 50 times to produce 50 resin molds A3, the mold used for the production of resin molds A3 was observed by the naked eye. Contamination of the mold was not observed.

By the procedures similar to those employed in Example 1, a composite 3-1 of resin mold A3/UV-cured resin composition product 1/resin mold B and a composite 3-2 of resin mold A3/UV-cured resin composition product 2/resin mold B were made.

Selectivity to mold release and defect of the cured resin composition product were evaluated on the composite 3-1 and composite 3-2. Evaluation results are shown in Table 1.

Example 4

A resin mold A4 having a thickness of 0.6 mm and a surface roughness of 0.05 μm was made by the same procedure as employed in Example 1 for the production of resin mold A1, except that pellet P4 was used instead of pellet P1.

The surface of the thus-obtained resin mold A4, which is to be in contact with a curable resins had a contact angle θ with water of 79 degree. When the above-mentioned molding procedure was repeated 50 times to produce 50 resin molds A4, the mold used for the production of resin molds A4 was observed by the naked eye. Contamination of the mold was not observed.

By the procedures similar to those employed in Example 1, a composite 4-1 of resin mold A4/UV-cured resin composition product 1/resin mold B and a composite 4-2 of resin mold A4/UV-cured resin composition product 2/resin mold B were made.

Selectivity to mold release and defect of the cured resin article 2 were evaluated on the composite 4-1 and composite 4-2. Evaluation results are shown in Table 1.

Example 5

A resin mold A5 having a thickness of 0.6 mm and a surface roughness of 0.05 μm was made by the same procedure as employed in Example 1 for the production of resin mold A1, except that pellet P5 was used instead of pellet P1.

The surface of the thus-obtained resin mold A5, which is to be in contact with a curable resin, had a contact angle θ with water of 22 degree. When the above-mentioned molding procedure was repeated 50 times to produce 50 resin molds A5, the mold used for the production of resin molds A5 was observed by the naked eye. Contamination of the mold was not observed.

By the procedures similar to those employed in Example 1, a composite 5-1 of resin mold A5/UV-cured resin composition product 1/resin mold B and a composite 5-2 of resin mold A5/UV-cured resin composition product 2/resin mold B were made.

Selectivity to mold release and defect of the cured resin composition product were evaluated on the composite 5-1 and composite 5-2. Evaluation results are shown in Table 1.

Example 6

A resin mold A6 having a thickness of 0.6 mm and a surface roughness of 0.05 μm was made by the same procedure as employed in Example 1 for the production of resin mold A1, except that pellet P6 was used instead of pellet P1.

The surface of the thus-obtained resin mold A6, which is to be in contact with a curable resin, had a contact angle θ with water of 29 degree. When the above-mentioned molding procedure was repeated 50 times to produce 50 resin molds A6, the mold used for the production of resin molds A6 was observed by the naked eye. Contamination of the mold was not observed.

By the procedures similar to those employed in Example 1, a composite 6-1 of resin mold A6/UV-cured-resin composition product 1/resin mold B and a composite 6-2 of resin mold A6/UV-cured resin composition product 2/resin mold B were made.

Selectivity to mold release and defect of the cured resin composition product were evaluated on the composite 6-1 and composite 6-2. Evaluation results are shown in Table 1.

Comparative Example 1

A resin mold A7 having a thickness of 0.6 mm and a surface roughness of 0.05 μm was made by the same procedure as employed in Example 1 for the production of resin mold A1, except that pellet P0 was used instead of pellet P1.

The surface of the thus-obtained resin mold A7, which is to be in contact with a curable resin, had a contact angle θ with water of 96 degree. When the above-mentioned molding procedure was repeated 50 times to produce 50 resin molds A7, the mold used for the production of resin molds A7 was observed by the naked eye. Contamination of the mold was not observed.

By the procedures similar to those employed in Example 1, a composite 7-1 of resin mold A7/UV-cured resin composition product 1/resin mold B and a composite 7-2 of resin mold A7/UV-cured resin composition product 2/resin mold B were made.

Selectivity to mold release and defect of the cured resin composition product were evaluated on the composite 7-1 and composite 7-2. Evaluation results are shown in Table 1.

Comparative Example 2

A resin mold A8 having a thickness of 0.6 mm and a surface roughness of 0.05 μm was made by the same procedure as employed in Example 1 for the production of resin mold A1, except that pellet P7 was used instead of pellet P1.

The surface of the thus-obtained resin mold A8, which is to be in contact with a curable resin, had a contact angle θ with water of 81 degree. When the above-mentioned molding procedure was repeated 50 times to produce 50 resin molds A8, the mold used for the production of resin molds A8 was observed by the naked eye. Contamination of the mold was not observed.

By the procedures similar to those employed in Example 1, a composite 8-1 of resin mold A8/UV-cured resin composition product 1/resin mold B and a composite 8-2 of resin mold A8/UV-cured resin composition product 2/resin mold B were made.

Selectivity to mold release and defect of the cured resin composition product were evaluated on the composite 8-1 and composite 8-2. Evaluation results are shown in Table 1.

Comparative Example 3

A resin mold A9 having a thickness of 0.6 mm and a surface roughness of 0.05 μm was made by the same procedure as employed in Example 1 for the production of resin mold A1, except that pellet P8 was used instead of pellet P1.

The surface of the thus-obtained resin mold A9, which is to be in contact with a curable resin, had a contact angle θ with water of 88 degree. The resin mold A9 was white, turbid. When the above-mentioned molding procedure was repeated 50 times to produce 50 resin molds A9, the mold used for the production of resin molds A9 was observed by the naked eye. The mold was contaminated with Kaowax 85P to a great extent.

A spacer made of PTFE resin having an inner diameter of 119 mm, an outer diameter of 120 mm and a thickness of 1 mm was placed on the resin mold B. The PTFE-placed surface of the resin mold B was coated with UV-curable resin composition 1 by spin coating. The resin mold A9 was superposed on the coating of UV-curable resin composition 1 so that air bubbles are not present between the coating and the resin mold A9. The resin mold A9-superposed side was irradiated with ultraviolet rays by using a 80 W/cm high pressure mercury lamp located 10 cm apart from the resin mold A9. The total amount of ultraviolet rays was 1,000 J/cm². However, the coating of UV-curable resin composition 1 could not be cured.

Similarly, the above-mentioned procedures were repeated by using UV-curable resin composition 2 instead of UV coating agent 1, but the coating of UV-curable resin composition 2 also could not be cured.

Comparative Example 4

A resin mold A10 having a thickness of 0.6 mm and a surface roughness of 0.05 μm was made by the same procedure as employed in Example 1 for the production of resin mold A1, except that pellet P9 was used instead of pellet P1.

The surface of the thus-obtained resin mold A10, which is to be in contact with a curable resin, had a contact angle θ with water of 74 degree. The resin mold A10 was white, turbid. When the above-mentioned molding procedure was repeated 50 times to produce 50 resin molds A10, the mold used for the production of resin molds A10 was observed by the naked eye. The mold was contaminated to a slight extent.

A spacer made of PTFE resin having an inner diameter of 119 mm, an outer diameter of 120 mm and a thickness of 1 mm was placed on the resin mold B. The PTFE-placed surface of the resin mold B was coated with UV-curable resin composition 1 by spin coating. The resin mold 10 was superposed on the coating of UV-curable resin composition 1 curable so that air bubbles are not present between the coating and the resin mold A10. The resin mold A10-superposed side was irradiated with ultraviolet rays by using a 80 W/cm high pressure mercury lamp located 10 cm apart from the resin mold A10. The total amount of light was 1,000 J/cm². However, the coating of UV-curable resin composition 1 could not be cured.

Similarly, the above-mentioned procedures were repeated by using UV-curable resin composition 2 instead of UV-curable resin composition 1, but the coating of UV-curable resin composition 2 also could not be cured.

TABLE 1

|  | N-containing organic compound or other ingredient (Amount) *1 | Selectivity to mold release | | Defect *4 |
|---|---|---|---|---|
|  |  | Resin 1 *2 | Resin 2 *3 |  |
| Example 1 | A 5 | 10/10 | 10/10 | A |
| Example 2 | A 3 | 10/10 | 10/10 | A |
| Example 3 | A 1 | 10/10 | 10/10 | A |
| Example 4 | A 0.5 | 10/10 | 10/10 | A |
| Example 5 | B 5 | 10/10 | 10/10 | A |
| Example 6 | C 5 | 10/10 | 10/10 | A |
| Comp. Ex. 1 | — 0 | 3/10 | 5/10 | U |
| Comp. Ex. 2 | D 5 | 8/10 | 8/10 | U |
| Comp. Ex. 3 | E 2 | — | — | U |
| Comp. Ex. 4 | F 5 | — | — | U |

Note.
*1 A: Poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]
B: 4-Benzoyloxy-2,2,6,6-tetramethylpiperadine
C: Bis(2,2,6,6-tetramethyl-4-piperldyl)sebacate
D: 2,4-Bis-(n-octylthlo)-6-(4-hydroxy-3,5-di-t-butylanilino)-1,3,5-triazine
E: Hardened castor oil
F: Anionic surface active agent
*2 Resin 1: UV-cured resin composition layer 1
*3 Resin 2: UV-cured resin composition layer 2
*4 Defect A: Acceptable U: Unacceptable As seen from Table 1, in the case when a curable resin is molded and cured by using a resin mold for molding a curable resin according to the present invention, which mold has been made by molding a resin composition comprising an alicyclic structure-containing polymer and a nitrogen-containing organic compound (X) having at least one nitrogen atom which is bonded to at least one tertiary or quaternary carbon atom, a resulting molded cured resin article in the state of being held by a specific mold can be obtained. Thus, improved selectivity to mold release can be attained, and the productivity of the molded cured resin article is enhanced (Examples 1 through 6).

In contrast, when a resin mold, which has been made by molding a resin composition comprising an alicyclic structure-containing polymer but not containing the nitrogen-containing organic compound (X), is used, the selectivity to mold release is poor (Comparative Example 1).

Similarly when a resin mold, which has been made by molding a resin composition comprising an alicyclic structure-containing polymer and a hindered phenol compound instead of the nitrogen-containing organic compound (X), is used, the selectivity to mold release is also poor (Comparative Example 2).

In the case when a resin mold, which has been made by molding a resin composition comprising an alicyclic structure-containing polymer and a lubricant such as hardened castor oil or an antistatic agent such as anionic surface active agent instead of the nitrogen-containing organic compound (X), is used, the resin mold has poor transparency and a curable resin cannot be molded and cured (Comparative Examples 3 and 4).

What is claimed is:

1. A combined resin mold for molding a curable resin which is a combination of two resin molds (A) and (B), wherein resin mold (A) is a resin mold for molding a curable resin, which has a surface, to be in contact with the curable resin, having a contact angle θ with water in the range of 10 to 95 degrees, and which is made by molding a realm composition comprising an alicyclic structure-containing polymer and a nitrogen-containing organic compound (X) having at least one nitrogen atom which is bonded to at least one tertiary or quaternary carbon atom.

2. The combined resin mold for molding a curable resin according to claim 1, wherein resin molds (A) and (B) are made by molding resin compositions comprising an alicyclic structure-containing polymer and nitrogen-containing organic compound (X) of different amounts within each of the resin molds.

3. The combined resin mold for molding a curable resin according to claim 2, wherein the resin composition used for resin mold (A) and the resin composition used for resin mold (B) comprise (a) % by weight and (b) % by weight, respectively, of the nitrogen-containing organic compound (X), based on the weight of the respective resin compositions; and, the two resin compositions satisfy the following formula:

$$(b) \leq (a)/10.$$

4. The combined resin mold for molding a curable resin according to claim 2, wherein the surface of resin mold (A) and the surface of resin mold (B), which surfaces are to be in contact with the curable resin, have contact angles with water of θ degree and θ' degree, respectively; and, the two resin molds (A) and (B) satisfy the following inequality: (θ+5)<θ'.

* * * * *